United States Patent
Wendelrup et al.

(10) Patent No.: US 6,809,649 B1
(45) Date of Patent: Oct. 26, 2004

(54) METHOD AND APPARATUS FOR COMMUNICATION BETWEEN AN ELECTRONIC DEVICE AND A CONNECTED BATTERY

(75) Inventors: Heino Wendelrup, Malmo (SE); Magnus Hansson, Malmo (SE)

(73) Assignee: Telefonaktiebolaget LM Ericsson(publ), Stockholm (SE)

( * ) Notice: Subject to any disclaimer, the term of this patent is extended or adjusted under 35 U.S.C. 154(b) by 0 days.

(21) Appl. No.: 09/238,007

(22) Filed: Jan. 26, 1999

(51) Int. Cl.[7] .............................................. G08B 21/00
(52) U.S. Cl. ............................... 340/636.1; 340/636.11; 340/636.12; 340/636.21; 320/106; 324/430; 455/572; 455/573
(58) Field of Search .................................. 340/636, 634, 340/346, 395, 692, 636.1, 636.11, 636.12, 636.18, 636.21; 320/112, 106, 120, 107, 132, 134, 136; 324/430; 455/426, 456, 572, 573

(56) References Cited

U.S. PATENT DOCUMENTS

| | | | | |
|---|---|---|---|---|
| 5,350,993 A | * | 9/1994 | Toya et al. ........................ 320/2 |
| 5,546,317 A | * | 8/1996 | Andrieu ........................ 702/63 |
| 5,587,924 A | * | 12/1996 | Rossi ........................ 364/496 |
| 5,703,467 A | | 12/1997 | Patino ........................ 320/106 |
| 5,744,937 A | * | 4/1998 | Cheon ........................ 320/125 |
| 5,796,239 A | * | 8/1998 | van Phuoc et al. ......... 320/107 |
| 5,850,134 A | * | 12/1998 | Oh et al. ..................... 320/106 |
| 5,873,045 A | * | 2/1999 | Lee et al. .................... 455/550 |
| 5,878,276 A | * | 3/1999 | Aebli et al. ................. 395/839 |
| 5,912,544 A | * | 6/1999 | Miyakawa et al. ......... 320/106 |
| 6,075,339 A | * | 6/2000 | Reipur et al. ............... 320/110 |

FOREIGN PATENT DOCUMENTS

| | | |
|---|---|---|
| JP | 05 251113 A | 9/1993 |
| JP | 09 308113 A | 11/1997 |
| JP | 10 098838 A | 4/1998 |

OTHER PUBLICATIONS

International Search Report for PCT/SE00/00140 dated Oct. 9, 2000, completed on Sep. 28, 2000.
*Expanded Battery Type Recognition Method*, IBM Technical Disclosure Bulletin, US, IBM Corp. New York, vol. 35, No. 3, Aug. 1, 1992, p. 420.
Battery With Code Resistor Needing No Additional Contact, by Scott M. Garrett, Motorola Technical Developments, US, Motorola Inc., vol. 20, Oct. 1993, p. 133, XP000403851.

\* cited by examiner

*Primary Examiner*—Davetta W. Goins
(74) *Attorney, Agent, or Firm*—Jenkens & Gilchrist, P.C.

(57) ABSTRACT

An apparatus supporting both identification of a battery type and communications over an interface between a battery and an electronic device is disclosed. The electronic device includes a processor for communicating with communications circuitry of the battery. Identification circuitry associated with the processor enables a determination of the type of battery with which the electronic device is connected. If a "smart" battery capable of carrying out serial communications with the electronic device is connected, the electronic device further provides means for carrying out communications between the processor and the communication circuitry of the battery.

17 Claims, 5 Drawing Sheets

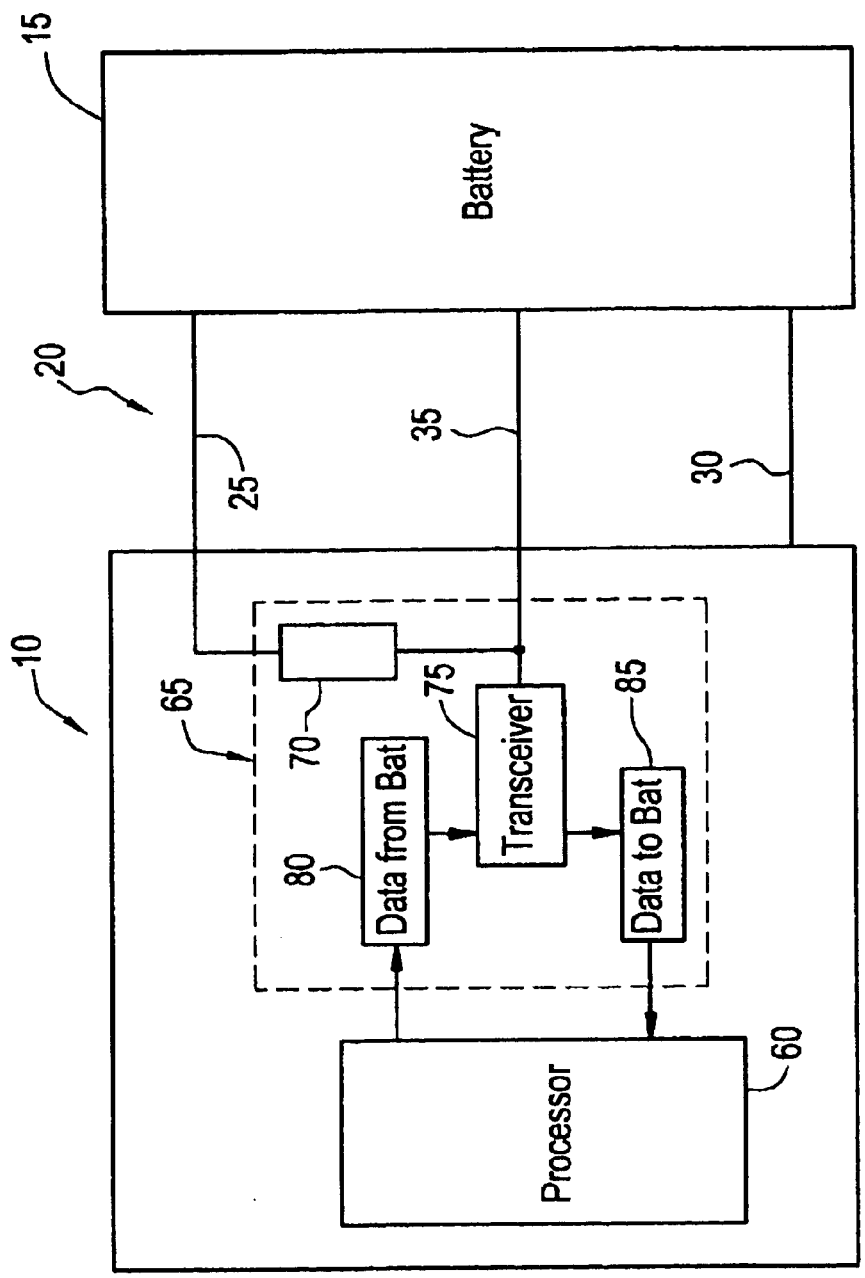

US 6,809,649 B1

METHOD AND APPARATUS FOR COMMUNICATION BETWEEN AN ELECTRONIC DEVICE AND A CONNECTED BATTERY

BACKGROUND OF THE INVENTION

1. Technical Field of the Invention

The present invention relates to information exchange between a connected electronic device and a battery, and more particularly, to the identification of and communication with an attached battery by an electronic device.

2. Description of Related Art

The development of cellular telephone technology has spurred a like need for development in the area of batteries and battery packs, and more specifically, for methods of communicating between a battery and an electronic device, such as a cellular telephone. Cellular telephones must utilize batteries in order to provide mobile capabilities. The battery is critical to the user of a cellular telephone, since the battery provides them with the ability to move about freely without being tied to a stationary power source.

Thus, in order to fully maximize the use of a cellular telephone, it is important that a user achieve maximum performance from an attached battery. This may be achieved by correctly charging the battery and always being able to identify the exact charging status of the battery. This enables a user to know how much standby time is remaining on the phone. This type of information enables the user to intelligently decide if the charge in a battery is sufficient for their needs or charging of the battery is required.

Developments of battery and battery pack related technologies have provided users with a variety of batteries which may be used with an electronic device, such as a cellular telephone. Users may have so-called "dumb", low-end batteries which merely provide a source of power to an electronic device and no further information. These batteries may not communicate with other devices. These type of batteries have a relatively low cost and are simple to use. The so-called "smart" batteries provide a user with a power source for an electronic device and further provide data transmission capabilities between the battery and the attached electronic device. A "super smart" battery may communicate with an attached electronic device exactly what the present charge status of the battery is and can calculate this information internally without any additional input from the attached electronic device. A "smart" battery may communicate with an attached electronic device and includes registers for storing information on the capacity of the battery.

Cellular telephones require the ability to operate with "super smart", "smart" and "dumb" batteries in order to fully utilize all technologies available. However, there presently exist no type of interface between a battery and electronic device that enables the identification of the particular type of battery attached to the electronic device, and further enables communications between the battery and the electronic device if the attached battery is identified as a "smart" battery. Furthermore, in the case of "dumb" batteries, there is a the need to provide a user of an electronic device with information identifying the amount of charge/standby time currently available to the user based on the current charge within the battery.

Existing battery communication systems have been developed for use with personal computers. These battery communication systems, while satisfactory for a personal computer operating environment, are too complex and expensive for use with smaller and cheaper electronic devices, such as a cellular telephone. Furthermore, such systems do not include the ability to operate with "dumb" batteries. Thus, there exist a need for a system overcoming these limitations.

SUMMARY OF THE INVENTION

The present invention overcomes the foregoing and other problems with an apparatus for supporting resistor keying and communications between a battery and an electronic device over an interface. The apparatus of the present invention enables a connection to be formed between a processor within an electronic device and a battery or battery pack. Circuitry within the electronic device enables the electronic device to determine what type of battery has been connected with the electronic device. The circuitry may comprise switches and a resistor or current source that work in conjunction with the processor to determine an exact resistance or capacitance value of a resistor or capacitor between the single pin interface and the ground pin. The resistance or capacitance value corresponds to a battery type.

Once the battery type is identified, if a "smart" battery is connected to the electronic device, the processor of the electronic device may communicate with the battery through a communications interface consisting of a transceiver and a pair of data registers. Data to be transmitted to the battery is written to a data-out register and then transmitted by the transceiver to the communications circuitry of the battery over a single pin interface. Data coming back from the communications circuitry of the battery pack is received by the transceiver and temporarily stored within a data-in register. The information remains in the data-in register until read by the processor.

In the case of a battery identified as a "dumb" battery (i.e., incapable of performing data communications with the electronic device), the battery may further include a first and second memory storage areas. The first memory storage area contains a numeric representation of the total capacity of the battery. The second memory stores a numeric representation of the current capacity of the battery. Upon connection of the battery to the electronic device, the numeric representation within the second memory is altered by the electronic device in response to the use or charging of the battery. Utilizing the numeric representation information from each of the memory storage areas, the processor associated with the electronic device may determine the charge capacity of the battery. For example, the system may determine whether the battery is half charged, full charged or quarter charged, much in the same way a fuel gauge provides information to the driver of an automobile.

BRIEF DESCRIPTION OF THE DRAWINGS

For a more complete understanding of the present invention, reference is made to the following detailed description taken in conjunction with the accompanying drawings wherein:

FIG. 3 is a block diagram illustrating the apparatus for identifying a battery type and communicating with a "smart" battery;

DETAILED DESCRIPTION OF THE INVENTION

Figure 1:
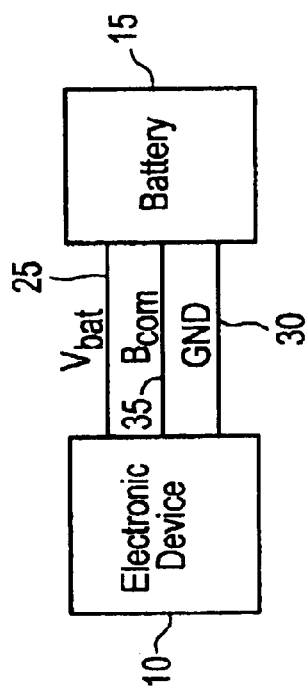
FIG. 1 is a block diagram illustrating the interface between a battery and an electronic device.

Referring now to the Drawings, and more particularly to FIG. 1, there is illustrated an interface between an electronic device 10 and a battery or battery pack 15. For purposes of discussion, the electronic device 10 will be described as a cellular telephone. However, it should be realized that any electronic device utilizing a similar interface with a battery or battery pack 15 could be utilized without departing from the spirit of the present invention. The battery 15 will consist of either a so-called "smart" or "dumb" battery.

The physical interface 20 between the cellular telephone 10 and battery 15 consists of a three-pin connection. A $B_{bat}$ pin 25 and GND pin 30 interconnect power between the cellular telephone 10 and battery 15. A third pin $B_{com}$ 35 provides for serial communications between the cellular telephone 10 and battery 15 over a single pin interface. The communication interface between the cellular telephone 10 and battery 15 utilizes half duplex serial communication over the pin $B_{com}$ 35. In a preferred embodiment, the communication is asynchronous having a data format of 2 start bits, eight data bits and one stop bit. The bit rate will be no greater than 1200 baud and will utilize RS 232 communication. It should of course be realized that other types of communication protocols and data formats and data speeds for the transmission of data between the cellular telephone 10 and battery 15 may be utilized.

Figure 2B:
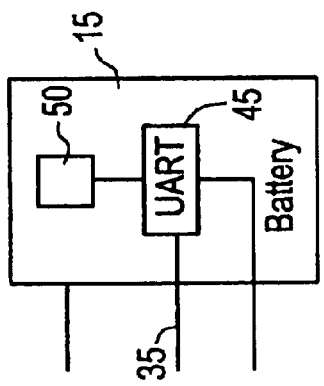
FIG. 2B is an illustration of a "smart" battery.
Figure 2A:
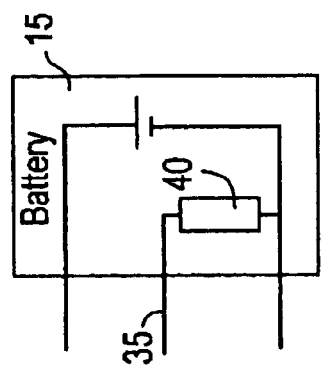
FIG. 2A is an illustration of a "dumb" battery, including a battery identification resistor.

Referring now to FIGS. 2A and 2B, there are illustrated both a "dumb" and "smart" battery, respectively. FIG. 2A illustrates a low cost "dumb" battery that does not include any extra logic or circuitry within the battery pack enabling communications between the cellular telephone 10 and battery 15. A "dumb" battery includes a battery-identification-resistor (BIR) 40 between the $B_{com}$ 35 and GND pin 30. The value of the BIR resistor 40 is set to a specific value that is associated only with the particular battery 15 with which the resistor is associated. In this manner, a cellular telephone 10 measuring the resistance between the $B_{com}$ pin 35 and GND pin 30 may easily differentiate between different types of batteries.

Referring now to FIG. 2B, there is illustrated a high-end or "smart" battery 15 capable of communicating with the cellular telephone 10. The information which may be communicated from the battery 15 to the cellular telephone 10 may include battery type, battery capacity, current battery status/capacity, number of load cycles, manufacturer, or manufacturing date. A "smart" battery 15 will normally include a processor 50 and some type of transceiver 45, such as a universal asynchronous receiver transmitter (UART). Rather than a processor 50, a hard wired logic circuit may also be used.

The transceiver 45 is able to transmit and receive signals to and from the battery via the $B_{com}$ pin 35. Additionally, some type authentication procedure may be performed between the battery 15 and cellular telephone 10. For example, the cellular telephone 10 may send an 8-bit word to the battery 15, and the battery would reply with a 16-bit word. In a preferred embodiment, the processor 50 and transceiver 45 would provide half duplex serial communication between the battery 15 and cellular telephone 10. However, it should be realized that full duplex or various other types of communication formats may be utilized.

Referring now to FIG. 3, there is illustrated an embodiment of the present invention. The system consist of the cellular telephone 10 interfaced with a battery 15 that comprises either a "smart" or "dumb" battery as discussed above. The cellular telephone 10 and battery 15 are interfaced using the three pin interface 20 consisting of a $V_{bat}$ pin 25, $B_{com}$ pin 35, and GND pin 30.

The cellular telephone 10 includes a processor 60 and battery interface 65. The processor 60 carries out serial communications with the battery 15 when a "smart" battery is detected. The battery interface 65 consist of battery identification circuitry 70, a transceiver 75 (preferably a universal asynchronous receiver transmitter (UART)) and a transmission data register 80 (DataToBat) and receiver register 85 (DataFromBat). Data Register 80 and 85 could also be combined into a single register. In a preferred embodiment, the battery interface 65 is implemented within a single application specific integrated circuit (ASIC). The ASIC would be designed to handle the battery voltage and include pins accessible externally from the cellular telephone 10.

Figure 4A:
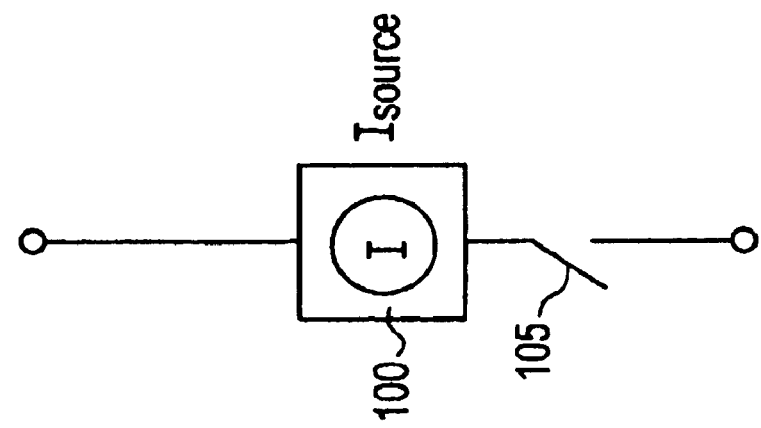
FIGS. 4A and 4B are illustrations of various embodiments of the circuitry for identifying a battery type connected to an electronic device.
Figure 4B:
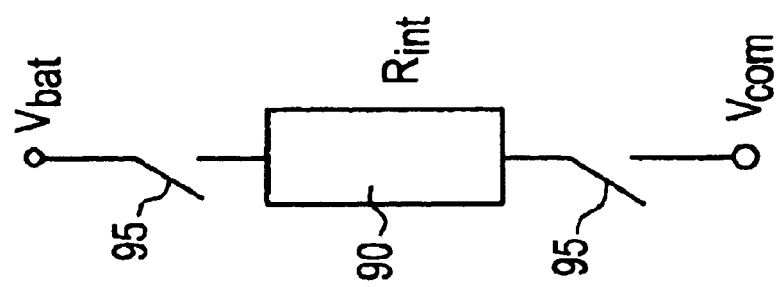

The battery identification circuitry 70 comprises means for determining the type of battery 15 connected to the cellular telephone 10. This is accomplished by identifying either the battery identification resistor 40 (FIG. 2A), or communications circuitry within the battery 15. Alternatively, the battery identification resistor 40 may comprise a capacitor or a combination of capacitor(s) and resistor(s). Referring now also to FIGS. 4A and 4B, there are illustrated two different embodiments of the battery identification circuitry 70. In a first embodiment, the battery identification circuitry 70, consists of a resistor 90 selectively connectable between the $V_{bat}$ pin 25 and the $B_{com}$ pin 35 via a pair of switches 95. In order to calculate the value of the BIR 40, the voltage drop over resistor 90 is measured. The resistance of the battery identification resistor 40 may then be calculated according to the equation:

$$BIR = V_{com}/(V_{bat} - V_{com})R_{int}$$

The resistor 90 need only be accurate enough for the required measurement. It is however possible to use a resistor 90 with a large spread if the error is canceled with an extra measurement and if adaptation of the software is utilized.

In a second embodiment illustrated in FIG. 2B, the battery identification circuitry 70 consist of a current generator 100 selectively switched between the $V_{bat}$ pin 25 and the $B_{com}$ pin 35 using switch 105. In a preferred embodiment, the current generator 100 would generate a 1mA current through the battery identification resistor 40. Then utilizing the known current through the battery identification resistor 40 and the voltage at the $B_{com}$ pin 35, the resistance of the BIR resistor 40 may be calculated according to the equation:

$$BIR = V_{com}/I_{source}$$

If the battery 15 is identified as being a "smart" battery capable of carrying out communication with the cellular telephone 10, the transceiver 75 and transmission and receiver data registers 80, 85 are utilized. Once the connection of a "smart" battery has been established, the processor 60 writes data to a transmission (DataToBat) register 80 within the battery interface 65. The transceiver 75 is set to an output mode and the data within register 80 is transmitted serially over $B_{com}$ 35 to communication circuitry (not shown) within the battery 15. Received data passes from the battery 15 to the cellular telephone 10 via the $B_{com}$ pin 35 and once received at transceiver 75 is stored within receiver data (DataFromBat) register 85. The interface 65 generates an interrupt to the processor 60, and the processor reads the data from register 85.

Figure 5:
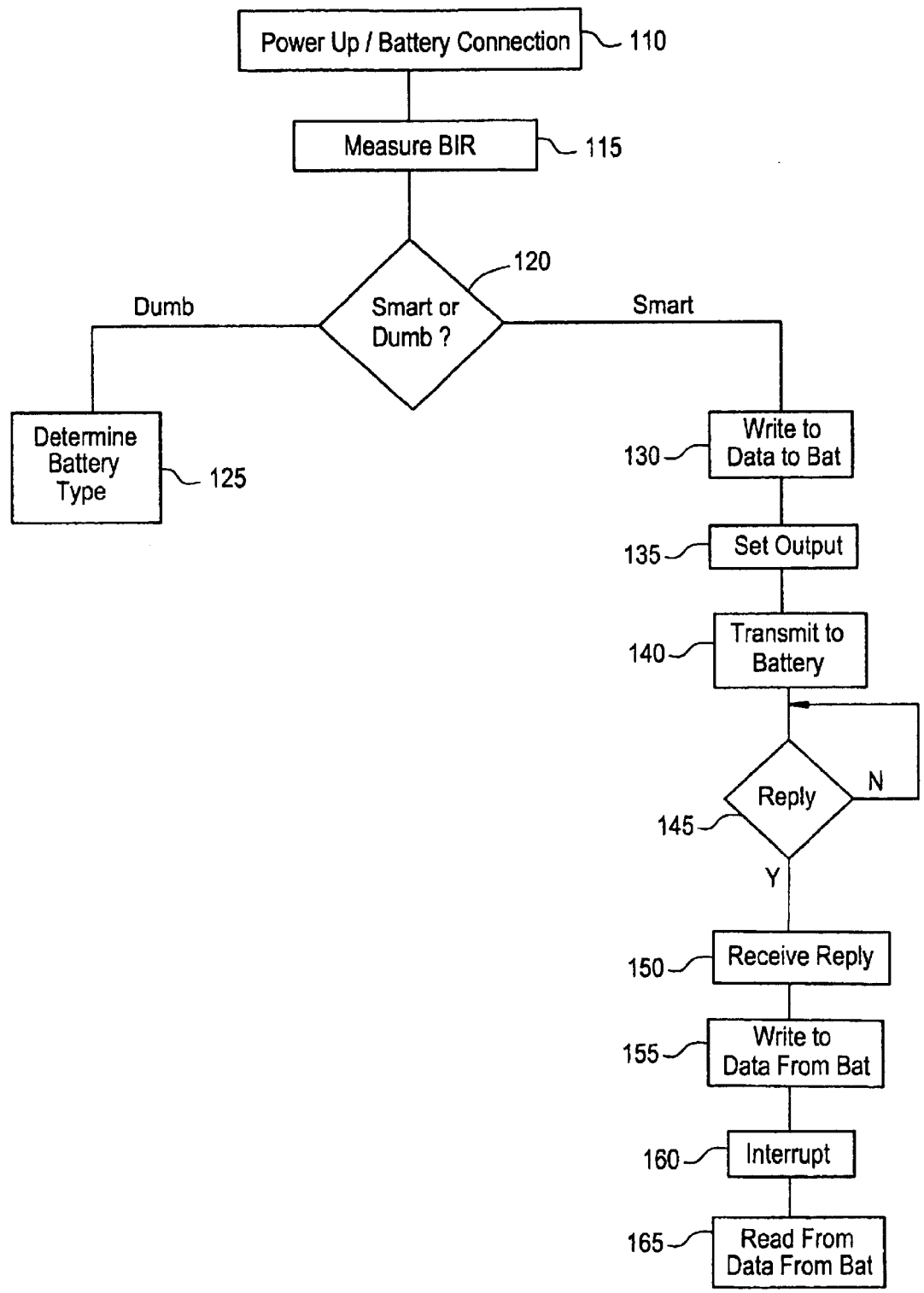
FIG. 5 is a flow diagram illustrating the data flow between an electronic device and a battery once the electronic device is powered-up or the battery is connected.

Referring now to FIG. 5, there is illustrated a flow diagram describing the data flow between the cellular telephone 10 and battery 15. Upon cellular telephone 10 power up or connection of the battery 15 at step 110, the resistance of the battery identification resistor 40 is measured at step 115. The cellular telephone 10 may alternatively attempt to communicate with the battery 15 prior to measuring the resistance of the battery identification resistor. A determination is then made at inquiry step 120 based on the resistance as to whether a "smart" or "dumb" battery 15 is connected to the cellular phone 10 if the battery is identified as a "dumb" battery, the particular type of "dumb" battery is established at step 125 based on the exact resistance of the BIR 40.

The existence of a very high resistance (or a specific resistance) for the BIR 40 establishes a "smart" battery is connected to the cellular telephone 10 with which serial communications are possible. The processor 60 of the cellular telephone 10 will then write at step 130 data to the DataToBat register 80 of the battery interface 65. The transceiver 75 is then set to an output mode at step 135, so that the data within the DataToBat register 80 may be transmitted to the battery 15 at step 140. The cellular telephone 10 awaits a reply to the data at step 45. Once a reply is received at step 150 by the transceiver 75, the received data is stored at step 155 within the DataFromBat register 85. An interrupt is generated to the processor 160 to notify it of data within the DataFromBat register 85. The processor 60 could alternatively be programmed to periodically poll the DataFromBat register 85 to determine if it contains data. The processor 60 reads the information from the DataFromBat register 85 at step 165.

Figure 6:
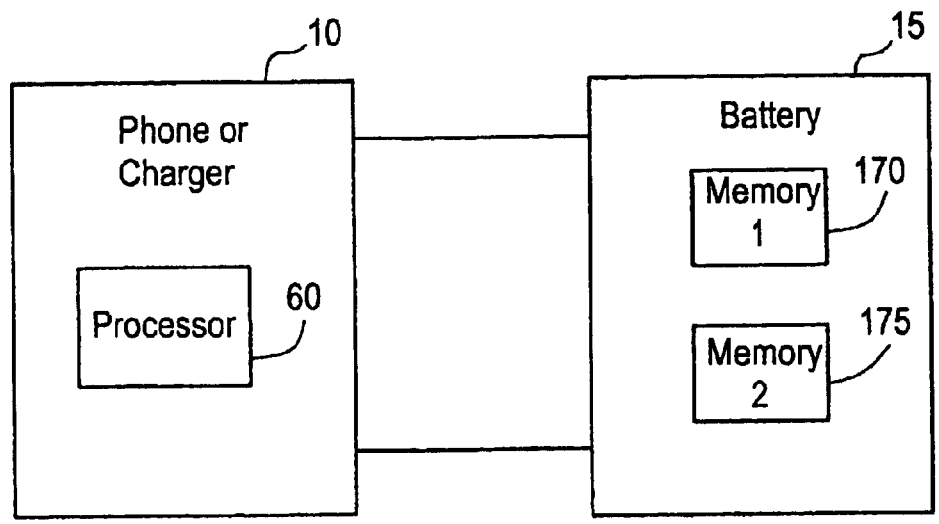
FIG. 6 is an illustration of an electronic device and battery wherein the battery includes means for identifying the percentage charge remaining with the battery.

Referring now to FIG. 6, there is illustrated a further method for communications between a cellular telephone 10 and a battery 15. The battery 15 is a "dumb" battery and includes first and second memories 170 and 175, respectively. The first memory 170 comprises a total capacity memory containing a numeric representation of the full capacity of the battery 15. For example, a battery 15 capable of providing 500 mAh can be coded as 20. The second memory 175 comprises a current capacity memory and is utilized to store a numeric representation of the current capacity of the battery 15. A fully-charged battery 15 would have the same numeric representation in both the total capacity memory 170 and the current capacity memory 175. Thus, according to the previous example, both memories would have a 20 stored in them when fully-charged.

An electronic device 10 using or providing a charge, such as a cellular telephone or a battery charger, monitors the current drawn from the battery 15 using a processor 60. As current is drawn away from or provided to the battery 15, the processor 60 updates the current capacity memory 175 whenever more than a specific amount of current has been used or supplied. For example, if 20 represented full capacity for the battery, the current capacity would be decreased one unit when the phone used 25 mAh of current. In the case of an electronic device, such as a battery charger, the numeric representation would be increased by one unit every time an additional 25 mAh of energy was stored within the battery. The same definition for one charge unit must be used in all battery types and chargers in order for the concept to function properly.

Figure 7:
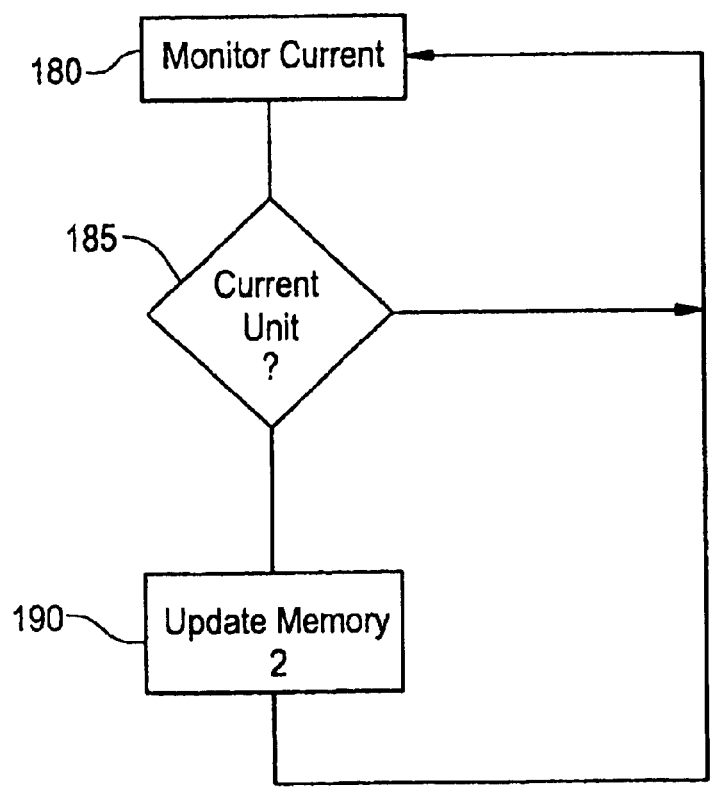
FIG. 7 is a flow diagram illustrating the method by which a current capacity memory is updated.

Referring now to FIG. 7, there is illustrated the manner in which a processor 60 would control the numeric representations stored within the first and second memories 170 and 175 to determine the present battery capacity. The processor monitors, at step 180, the current drawn from the battery 15. Inquiry step 185 determines whether an amount of current associated with a single unit of the numeric representation has been withdrawn from or added to the battery 15. If not, control passes back to step 180 and the current is continuously monitored.

When an amount of current is added or subtracted from the battery 15, equal to a selected number of units (i.e., one) of the numeric representation, this information is transmitted to the current capacity memory 175 to update the memory to the present charge capacity of the battery, control then returns back to step 180. In this manner, a "smart" battery may provide sufficient information to a cellular telephone or battery charger to indicate its current charge status without having to measure the current. The updates could also take place at a selective time interval.

Utilizing this implementation is possible to provide a cellular telephone 10 with accurate information about the capacity status of the battery 15. The processor 60 may access memories 170 and 175 to determine the current level of charge of the battery 15. This system is inexpensive and simple to implement, and does not require any intelligence or measuring capabilities in the battery 15.

Although preferred embodiments of the method and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. An apparatus supporting both battery identification and communications over between a battery and an electronic device, comprising:

a three-pin interface for connecting the battery and the electronic device and the battery, said three-pin interface comprising:

first and second pins for interconnecting power between the electronic device and the battery;

a third pin for providing serial communications between the electronic device and the battery;

a first circuitry within the electronic device capable of communicating with the battery through the three-pin interface;

means for identifying a type of the battery connected to the electronic device; and means enabling communications between the first circuitry and communications circuitry within the battery through the three-pin interface.

2. The apparatus of claim 1, wherein the serial communications comprise half duplex, asynchronous communications.

3. The apparatus of claim 1, wherein the means for enabling communications, comprises:

a transceiver for transmitting and receiving serial communications between the electronic device and the communications circuitry of the battery;

first means for holding data to be transmitted by the transceiver; and second means for holding data received by the transceiver.

4. The apparatus of claim 3, wherein the transceiver comprises a universal asynchronous transmitter receiver.

5. The apparatus of claim 3, wherein the first and second means for holding comprise data registers.

6. The apparatus of claim 1 wherein a bit rate between the processor and communications circuitry of the battery is no greater than 1200 baud.

7. The apparatus of claim 1, wherein the means for identifying comprises means for determining at least one of a resistance, capacitance, or short circuit located in the battery, the resistance or capacitance identifying the type of the battery.

8. The apparatus of claim 7, wherein the means for determining comprises:

a resistor connected within the electronic device; and means associated with the processor for calculating a resistance in the battery in response to a resistance value of the resister connected within the electronic device and a voltage drop across the resistor.

9. The apparatus of claim 7, wherein the means for determining comprises:

a capacitor connected within the electronic device; and means associated with the processor for calculating a capacitance in the battery pack in response to a capacitance value of the capacitor connected within the electronic device and a voltage drop across the capacitor.

10. The apparatus of claim 7, wherein the means for determining comprises:

a current source within the electronic device for generating a current; and means associated with the processor for calculating the resistance in the battery in response to current provided by the current source and a voltage level at a communication pin interface.

11. The apparatus of claim 1, wherein the battery includes:

a first memory for storing a representation of a total capacity of the battery pack; and a second memory for storing a representation of the current capacity of the battery, such that means associated with the electronic device may calculate the present charge level of the battery in response to the representations in the first and second memories.

12. A method enabling both battery identification and serial communication over an interface between a battery and an electronic device, comprising the steps of:

selectively switching a current source between system voltage and a communications pin in the electronic device in response to an active connection between the battery and the electronic device; and determining an impedance between a communications pin and a ground pin within the battery in response to a current supplied by the current source and the voltage level at the communications pin;

determining whether the battery has communications capabilities and a type of the battery based on the impedance.

13. The method of claim 12 further including the step of enabling communications between the electronic device and the battery upon determining that the battery has communications capabilities.

14. The method of claim 13 wherein the step of enabling communications further comprises the steps of:

placing data to be transmitted to the battery into a first data register;

transmitting the data in the first data register to the battery via the communications pin;.

receiving data from the battery via the communications pin;

placing the received data from the battery into a second data register; and reading the received data within the second data register.

15. The method of claim 12 wherein the step of measuring further includes the steps of:

selectively switching an impedance between system voltage and the communications pin;

determining the impedance in response to a value of the resistance between system voltage and the single communication pin, a voltage level at the communications pin and the system voltage level.

16. A method enabling both battery identification and communication over an interface between a battery and an electronic device, comprising the steps of:

attempting to communicate with the battery from the electronic device via a serial connection responsive to a connection between the battery and the electronic device;

selectively switching a current source in the electronic device between system voltage and a communications pin if the electronic device may not communicate with the battery; and determining a first resistance value in the battery responsive to a current value provided by the current source.

17. The method of claim 12, further including the step of attempting to communicate with the battery from the electronic device prior to the step of selectively switching.

* * * * *

UNITED STATES PATENT AND TRADEMARK OFFICE
CERTIFICATE OF CORRECTION

PATENT NO. : 6,809,649 B1
DATED : October 26, 2004
INVENTOR(S) : Heino Wendelrup It is certified that error appears in the above-identified patent and that said Letters Patent is hereby corrected as shown below:

<u>Title page,</u>
Item [56], References Cited, U.S. PATENT DOCUMENTS, add the following:

| | | | |
|---|---|---|---|
| -- 5,043,651 | 08/27/91 | Tamura | 320/43 |
| 4,553,081 | 11/12/85 | Koenck | 320/43 |
| 5,508,599 | 04/16/96 | Koenck | 320/21 |
| 5,563,496 | 10/08/96 | McClure | 320/48 |
| 5,577,070 | 11/19/96 | King et al. | 375/257 |
| 5,495,503 | 02/27/96 | King et al. | 375/257 |
| 5,514,946 | 05/07/96 | Lin et al. | 320/31 |
| 5,248,929 | 09/28/93 | Burke | 320/48 |
| 5,032,825 | 07/16/91 | Kuznicki | 340/636 |
| 5,539,298 | 07/23/96 | Perkins et al. | 320/21 |
| 4,387,334 | 6/07/83 | Loper | 320/44 |
| 5,455,499 | 10/3/95 | Uskali et al. | 320/43 |
| 5,546,317 | 08/13/96 | Andrieu | 364/481 |
| 4,680,527 | 07/14/87 | Benenati et al. | 320/2 |
| 5,371,453 | 12/06/94 | Fernandez | 320/5 |
| 5,534,765 | 07/09/96 | Kreisinger et al | 320/30 --. |

FOREIGN PATENT DOCUMENTS, add the following:

| | | |
|---|---|---|
| -- EP | 0 502 623 A1 | 09/09/92 |
| EP | 0 502 623 B1 | 09/02/98 |
| EP | 0 743 531 A2 | 11/20/96 |
| EP | 0 743 531 A3 | 04/23/97 |
| EP | 0 743 532 A2 | 11/20/96 |
| EP | 0 743 532 A3 | 04/23/97 |
| EP | 0 743 533 A2 | 11/20/96 |
| EP | 0 743 533 A3 | 04/16/97 |
| EP | 0 743 534 A2 | 11/20/96 |
| EP | 0 743 534 A3 | 04/23/97 |
| EP | 0 794 480 A1 | 09/10/97 |
| EP | 0 750 215 A2 | 12//27/96 |
| EP | 0 523 526 A2 | 01/20/93 |
| WO | 92/17231 | 10/15/92 |
| WO | 96/30960 | 10/03/96 |
| WO | 94/05068 | 03/03/94 |
| GB | 2 310 344 A | 08/20/97 |
| JP | 03169780 | 07/10/91 --. |

UNITED STATES PATENT AND TRADEMARK OFFICE
CERTIFICATE OF CORRECTION

PATENT NO. : 6,809,649 B1
DATED : October 26, 2004
INVENTOR(S) : Heino Wendelrup It is certified that error appears in the above-identified patent and that said Letters Patent is hereby corrected as shown below:

<u>Title page (cont'd),</u>
OTHER PUBLICATIONS, add the following:
-- "High Power Discharge Capacity Test for Lead Acid Batteries", IBM Technical Disclosure Bulletin, Vol. 39, No. 01, January 1996, XP-002106198 --.

Signed and Sealed this

Thirteenth Day of December, 2005

JON W. DUDAS
*Director of the United States Patent and Trademark Office*